US011896451B2

(12) United States Patent
Kim et al.

(10) Patent No.: US 11,896,451 B2
(45) Date of Patent: Feb. 13, 2024

(54) METHOD OF MANUFACTURING OVERDENTURE AND FLATTENING GUIDE APPLIED THERETO FOR MANUFACTURING THE OVERDENTURE

(71) Applicant: DIO Corporation, Busan (KR)

(72) Inventors: Jin Cheol Kim, Yangsan-si (KR); Jin Baek Kim, Busan (KR)

(73) Assignee: DIO CORPORATION, Busan (KR)

( * ) Notice: Subject to any disclaimer, the term of this patent is extended or adjusted under 35 U.S.C. 154(b) by 652 days.

(21) Appl. No.: 16/702,685

(22) Filed: Dec. 4, 2019

(65) Prior Publication Data
US 2021/0106410 A1    Apr. 15, 2021

(30) Foreign Application Priority Data
Oct. 11, 2019    (KR) .......................... 10-2019-0126002
Oct. 11, 2019    (KR) .......................... 10-2019-0126006

(51) Int. Cl.
| | | |
|---|---|---|
| *A61C 13/00* | (2006.01) | |
| *A61C 7/00* | (2006.01) | |
| *A61C 9/00* | (2006.01) | |
| *A61C 13/107* | (2006.01) | |
| *A61C 13/08* | (2006.01) | |
| *A61C 1/08* | (2006.01) | |

(Continued)

(52) U.S. Cl.
CPC .......... *A61C 13/0004* (2013.01); *A61C 1/084* (2013.01); *A61C 7/002* (2013.01); *A61C 9/004* (2013.01); *A61C 13/0001* (2013.01); *A61C 13/0019* (2013.01); *A61C 13/08* (2013.01); *A61C 13/12* (2013.01); *A61C 13/34* (2013.01); *G06T 7/30* (2017.01); *G06T 2207/30036* (2013.01)

(58) Field of Classification Search
CPC ............ A61C 13/0001; A61C 13/0004; A61C 13/0019; A61C 13/08; A61C 13/12; A61C 13/34; A61C 1/084; A61C 7/002; A61C 9/004; G06T 7/30; G06T 2207/30036
See application file for complete search history.

(56) References Cited

U.S. PATENT DOCUMENTS 9,549,785 B2 *    1/2017    Kim .......................... A61B 6/14
2012/0179281 A1 *    7/2012    Steingart ................. A61C 13/10
703/11

(Continued)

FOREIGN PATENT DOCUMENTS

KR    10-2014-0127066    11/2014
KR    10-1544774    8/2015
(Continued)

*Primary Examiner* — Nicholas D Lucchesi
*Assistant Examiner* — Hao D Mai
(74) *Attorney, Agent, or Firm* — LEX IP MEISTER, PLLC

(57) ABSTRACT

Disclosed is a method of manufacturing a digital overdenture to improve manufacturing convenience and preciseness. The method of manufacturing the digital overdenture according to the present invention includes a series of operations such as generating a planning image, manufacturing auxiliary devices for manufacturing the overdenture such as a surgical guide, a flattening guide, an impression model, and the like, setting a holder device and correcting a temporary denture, obtaining a corrected-scanned image, and designing and manufacturing a digital overdenture.

8 Claims, 6 Drawing Sheets

(51) Int. Cl.
     *A61C 13/12*        (2006.01)
     *A61C 13/34*        (2006.01)
     *G06T 7/30*         (2017.01)

(56) References Cited

U.S. PATENT DOCUMENTS

| | | | |
|---|---|---|---|
| 2012/0276502 A1* | 11/2012 | Marshall | A61C 9/0053 |
| | | | 433/199.1 |
| 2013/0260337 A1* | 10/2013 | Duncan | A61C 1/084 |
| | | | 433/173 |
| 2018/0263737 A1* | 9/2018 | Simmonds | G16H 50/50 |
| 2021/0161626 A1* | 6/2021 | Kim | A61C 13/0001 |

FOREIGN PATENT DOCUMENTS

| KR | 10-2018-0098230 | 9/2018 |
|---|---|---|
| KR | 10-1940743 | 1/2019 |

* cited by examiner

[Fig. 1]
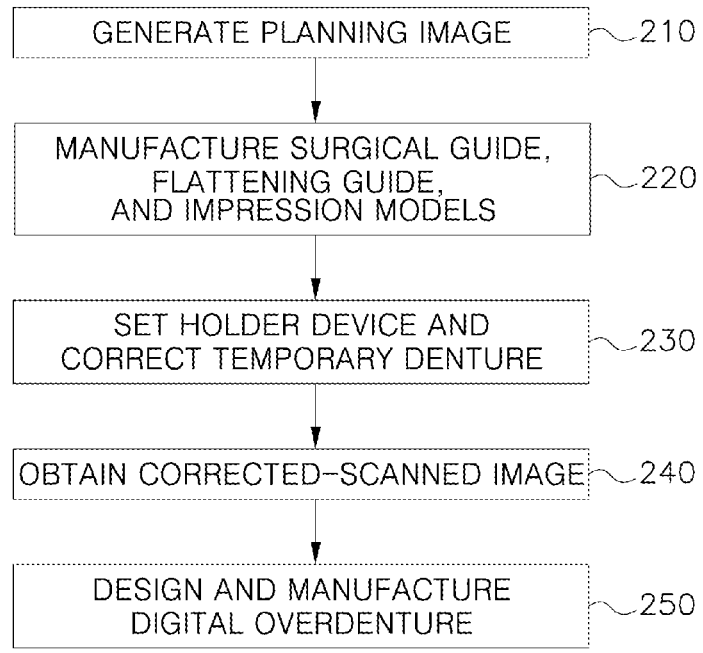
[Fig. 2]
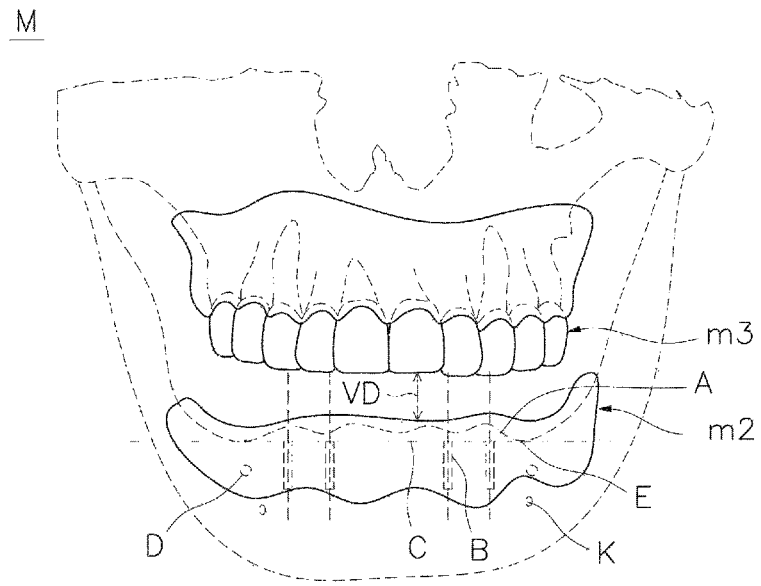

[Fig. 3]
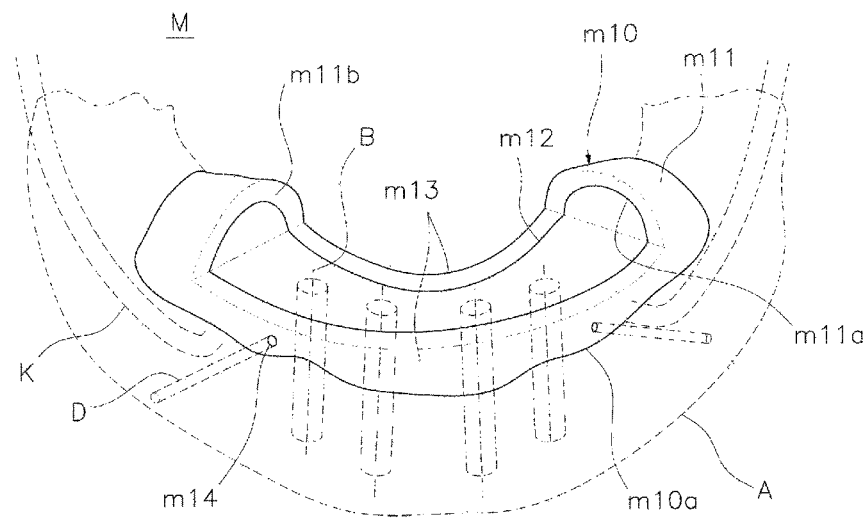
[Fig. 4a]
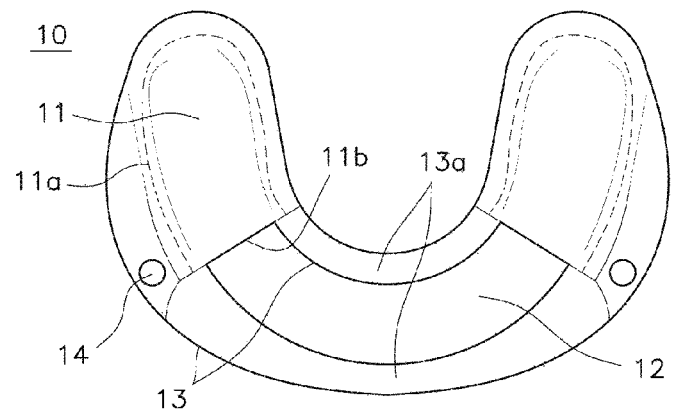
[Fig. 4b]
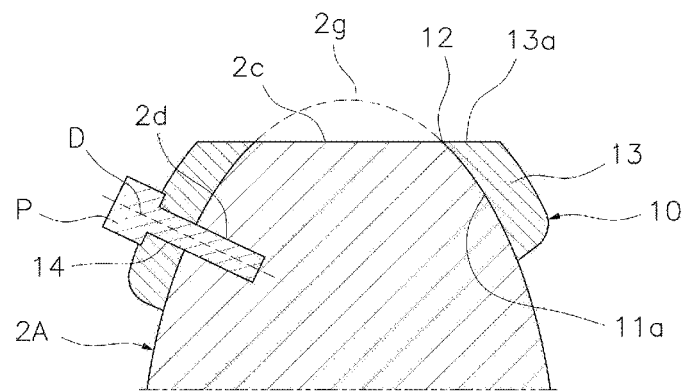

[Fig. 5]
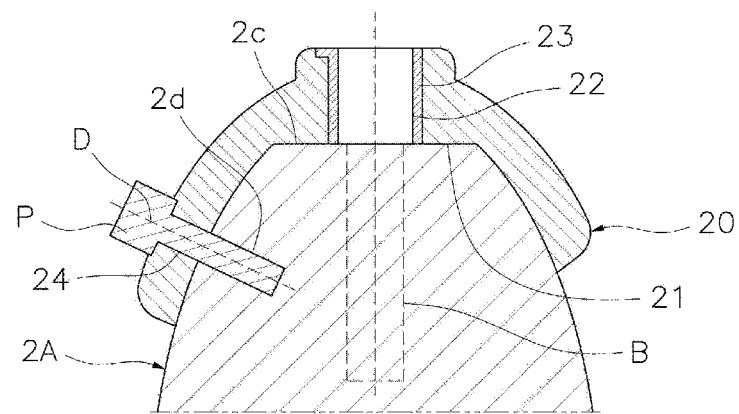
[Fig. 6]
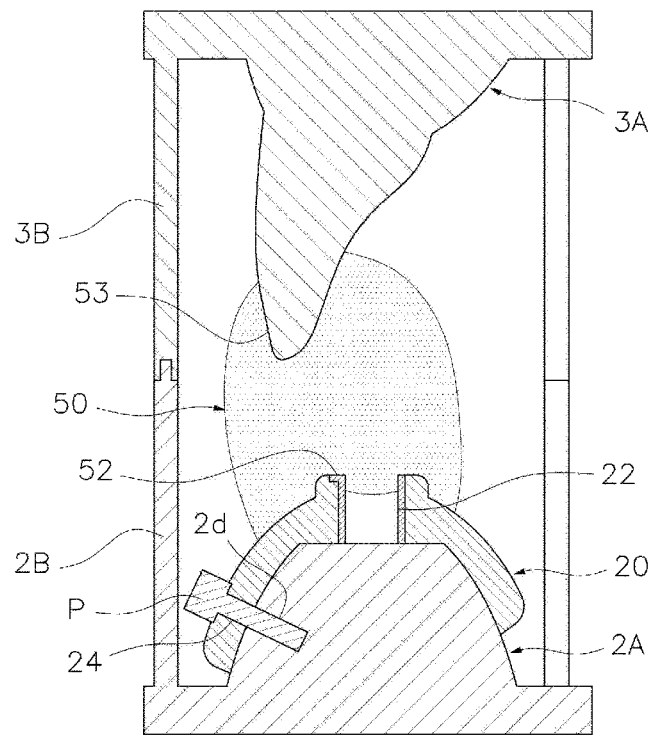

[Fig. 7a]
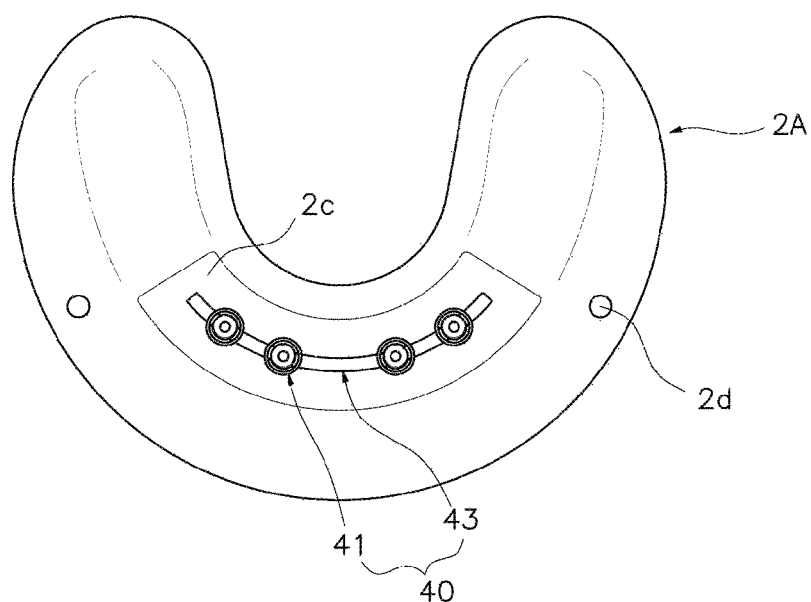
[Fig. 7b]
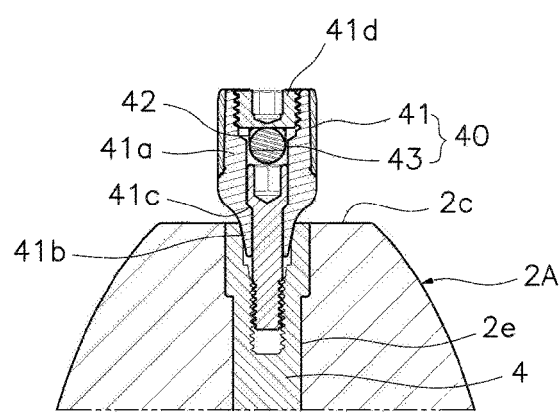

[Fig. 8]
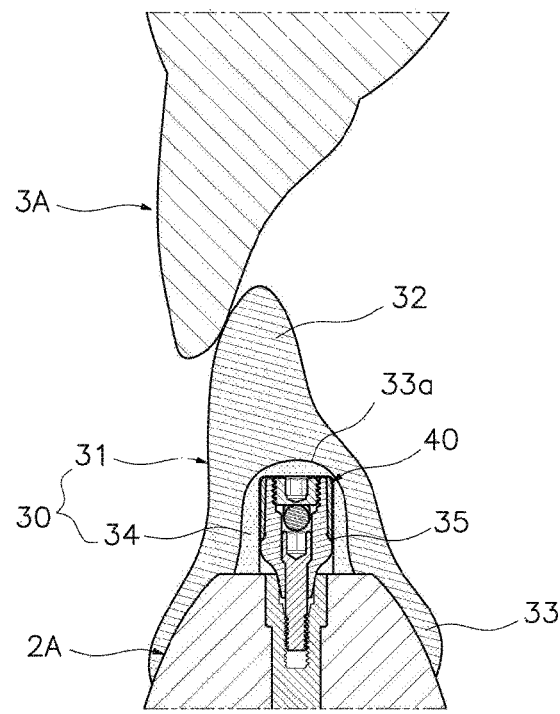
[Fig. 9]
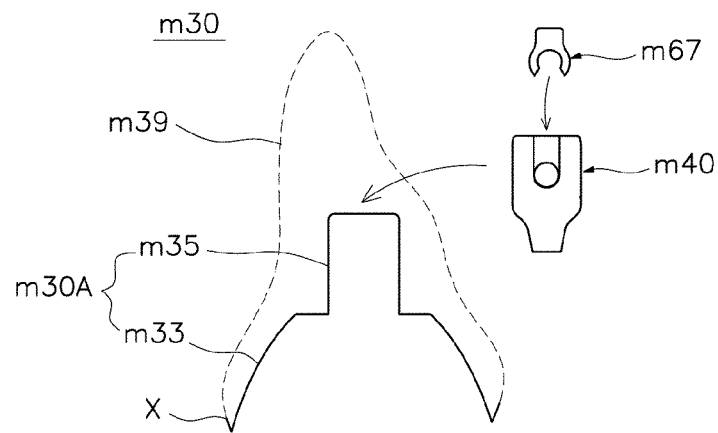

[Fig. 10]
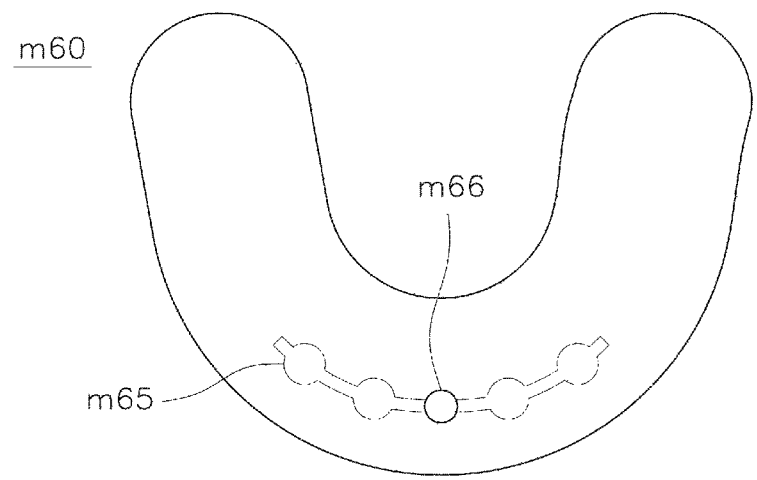
[Fig. 11a]
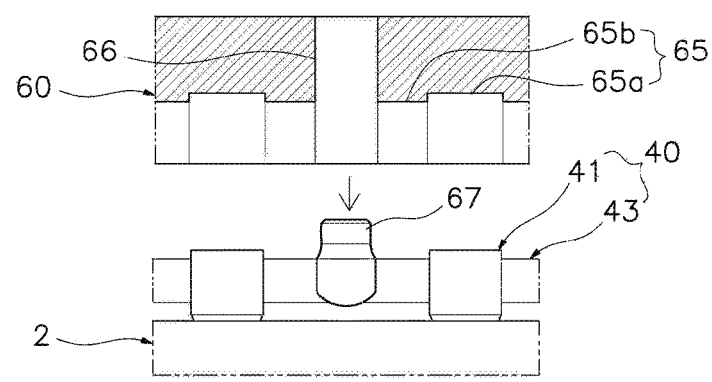
[Fig. 11b]
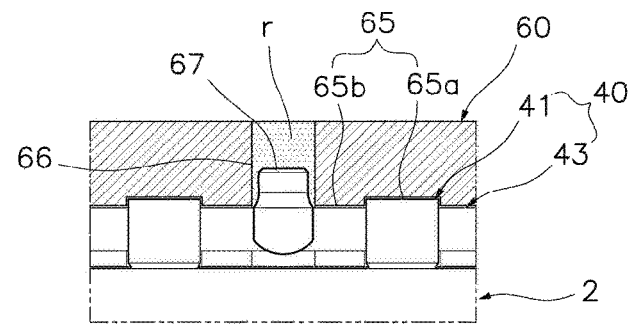

METHOD OF MANUFACTURING OVERDENTURE AND FLATTENING GUIDE APPLIED THERETO FOR MANUFACTURING THE OVERDENTURE

CROSS-REFERENCE TO RELATED APPLICATION

This application claims the benefit of Korean Application No. 10-2019-126002 and 10-2019-126006 which was respectively filed on Oct. 11, 2019, which were hereby incorporated by reference as fully set forth herein.

BACKGROUND

1. Field of the Invention

The present invention relates to a method of manufacturing a digital overdenture and a flattening guide applied thereto for manufacturing the digital overdenture, and more particularly, to a method of manufacturing a digital overdenture with improved convenience and preciseness and a flattening guide applied thereto for manufacturing the digital overdenture.

2. Discussion of Related Art

In general, a denture or a dental prosthesis is an intraoral prosthesis which replaces a broken natural tooth and artificially restores an exterior and function thereof. Here, the denture or dental prosthesis may be installed in the oral cavity to restore a mastication function and to prevent the periodontium from being deformed. Such dentures or dental prostheses may be classified into partial/complete dentures and partial/complete dental prostheses according to the number of damaged teeth.

Meanwhile, dental cement is applied to an internal shape-coupling groove such that the denture is bonded to and installed on a surface of a gum. Accordingly, since an occlusal pressure is directly applied to the gum, a feeling of irritation and pain are caused. On the other hand, the dental prosthesis is fixed to a fixture implanted into an alveolar bone such that a feeling of irritation and pain of a gum caused by an occlusal pressure are reduced. However, the dental prosthesis is substantially permanently fixed to the oral cavity so as to be difficult to be managed. Thus, an overdenture which overcomes disadvantages of the denture and the dental prosthesis has been disclosed.

In detail, the overdenture is detachable from the oral cavity like the denture while being fixed to a fixture implanted into an alveolar bone like the dental prosthesis such that management such as cleaning and the like is easy. Here, the overdenture includes a coupling device selectively coupled with an abutment fixed to the fixture.

Here, a conventional coupling device is provided as a ball type separately matched with each of a plurality of such fixtures/abutments implanted into and fixed to the alveolar bone or provided as a bar type which passes the plurality of fixtures/abutments.

Here, since the ball type coupling device is separately coupled with each of the fixtures/abutments, preciseness of a position of the abutment is necessary. Accordingly, when any one of the coupling devices is not formed in a precise position, an overdenture is not precisely installed.

Also, the bar type coupling device includes an insertion groove to allow a round fixing bar passing the plurality of fixtures/abutments to be inserted therein. Accordingly, it is easier to fasten the bar type coupling device than the ball type coupling device. Here, the fixing bar is formed of a stiff metal material. Accordingly, it is necessary to allow implantation heights of the plurality of fixtures/abutments, which the fixing bar passes, in the alveolar bones to mutually coincide with each other. However, in the case of an alveolar bone where a natural tooth is already lost or extracted, an outer surface thereof is curved such that it is difficult to precisely fix the bar type coupling device.

Also, generally, designs of an overdenture and a coupling device are formed on the basis of an impression body obtained corresponding to an oral cavity and a computerized tomography (CT) image. Here, in the case of the CT image, information about an alveolar bone is easy but it is difficult to obtain information about a gum which is soft tissue. Also, in the case of the impression body, excessive time is consumed during a process of obtaining an impression and manufacturing a model and it is difficult to obtain precise oral cavity information because the gum is pressurized while the gum is obtained. Consequently, the manufactured overdenture is not precisely installed in the oral cavity such that a feeling of irritation and pain increase in use.

In addition, since a series of operations such as implanting a fixture and fixing an abutment and a coupling device are performed depending on the experience of a practitioner, preciseness in a procedure decreases. Also, a process of manufacturing the overdenture is excessively increased such that the discomfort of a patient increases.

SUMMARY OF THE INVENTION

According to an aspect of the present invention, there is provided a method of manufacturing a digital overdenture. The method includes a first stage of designing and manufacturing a surgical guide in which pieces of flattening information are arranged with alveolar bone information in a horizontal direction and a plurality of pieces of implantation information of fixtures are set to be aligned inside the alveolar bone information to allow a top end to correspond to the flattening information in a planning image generated to be displayed as a three-dimensional (3D) image in which surface information of a target arch and an opposing arch and the alveolar bone information are aligned corresponding to a preset vertical dimension while a guide hole configured to guide implanting of the fixture is formed on the basis of the implantation information, a second stage of preparing a temporary denture corrected to form a temporary holder insertion portion inserted into and shape-matched with a holder device in an inner surface portion while the surgical guide is installed in the alveolar bone of the target arch flattened according to the implantation information and the holder device is fixed to the implanted fixture, a third stage of obtaining the corrected temporary denture through scanning and obtaining a corrected-scanned image swapped to expose 3D surface information of the temporary holder insertion portion, and replacing and swapping the 3D surface information of the temporary holder insertion portion with a virtual holder device extracted from a digital library and virtually disposed, and a fourth stage of manufacturing the digital overdenture on the basis of design information in which an artificial tooth portion and an artificial gum portion are included while an inner surface portion of the artificial gum portion is set corresponding to the virtual holder device.

According to another aspect of the present invention, there is provided a flattening guide for manufacturing a digital overdenture designed and manufactured using alveolar bone information of a target arch obtained for an oral cavity and flattening information set to be with the alveolar bone information in a horizontal direction. The flattening guide includes a shape-coupling groove portion having an outer edge formed along an entirety of inner and outer surfaces of the alveolar bone information to surround an alveolar bone of the target arch while being formed to be divided into both ends such that an inner surface is shape-matched with a surface of the alveolar bone information, a stopper connecting portion configured to connect an outer end and an inner end of the shape-coupling groove portion to form an opening portion set along a boundary area in which the alveolar bone information and the flattening information are alternated such that the alveolar bone of the target arch passes therethrough and is exposed outward while a flattening guide surface configured to guide a movement area of a flattening device configured to flatten the alveolar bone corresponding to the flattening information is formed on an outer surface, and a flattening anchor fixing portion to which an anchor pin formed on a side portion of any one of the shape-coupling groove portion and the stopper connecting portion and fixed to the target arch is fastened while passing therethrough.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a flowchart illustrating a method of manufacturing a digital overdenture according to one embodiment of the present invention;

FIG. 2 is an exemplary view illustrating a planning image in the method of manufacturing the digital overdenture according to one embodiment of the present;

FIG. 3 is an exemplary view illustrating a process of designing a flattening guide in the method of manufacturing the digital overdenture according to one embodiment of the present invention;

FIGS. 4A and 4B are exemplary views illustrating the flattening guide in the method of manufacturing the digital overdenture according to one embodiment of the present invention;

FIG. 5 is an exemplary view illustrating a surgical guide in the method of manufacturing the digital overdenture according to one embodiment of the present invention;

FIG. 6 is an exemplary view illustrating a process of manufacturing an alignment piece using an impression model in the method of manufacturing the digital overdenture according to one embodiment of the present invention;

FIGS. 7A and 7B are exemplary views illustrating a state in which a holder device is set in the method of manufacturing the digital overdenture according to one embodiment of the present invention;

FIG. 8 is an exemplary view illustrating a process of correcting a temporary denture in the method of manufacturing the digital overdenture according to one embodiment of the present invention;

FIG. 9 is an exemplary view illustrating a process of obtaining a corrected-scanned image in the method of manufacturing the digital overdenture according to one embodiment of the present invention;

FIG. 10 is an exemplary view illustrating a process of obtaining design information in the method of manufacturing the digital overdenture according to one embodiment of the present invention; and FIGS. 11A and 11B are exemplary views illustrating a process of fixing a clip in the method of manufacturing the digital overdenture according to one embodiment of the present invention.

DETAILED DESCRIPTION OF EXEMPLARY EMBODIMENTS

Hereinafter, a method of manufacturing a digital overdenture and a flattening guide applied thereto for manufacturing the digital overdenture according to one embodiment of the present invention will be described in detail with reference to the attached drawings.

FIG. 1 is a flowchart illustrating the method of manufacturing the digital overdenture according to one embodiment of the present invention, and FIG. 2 is an exemplary view illustrating a planning image in the method of manufacturing the digital overdenture according to one embodiment of the present invention.

As shown in FIGS. 1 and 2, the method of manufacturing the digital overdenture according to the present invention includes a series of operations such as generating a planning image (210), manufacturing auxiliary devices for manufacturing the overdenture such as a surgical guide, a flattening guide, an impression model, and the like (220), setting a holder device and correcting a temporary denture (230), obtaining a corrected-scanned image (240), and designing and manufacturing a digital overdenture (250).

Meanwhile, a target arch which will be described below may be preferably understood as a dental arch which needs the digital overdenture and will be described and illustrated as a lower jaw that is an edentulous jaw. Also, an opposing arch may be preferably understood as a dental arch occluded with the target arch and will be described and illustrated as an upper jaw that is a dentulous jaw. According to circumstances, the present invention may be equally applied to a process of manufacturing a digital overdenture to be installed in a case in which an upper jaw or both upper and lower jaws are edentulous jaws.

In addition, the temporary denture is a denture preliminarily manufactured to obtain precise design information on a final digital overdenture which is finally manufactured, and the digital overdenture may be preferably understood as intraoral prosthesis tissue to be actually installed and used in an oral cavity. Here, since the temporary denture may not only provide design information for manufacturing the digital overdenture but also be temporarily used by a patient during a period of manufacturing the digital overdenture, utilization and convenience during a dental restoration process may be significantly improved.

The method of manufacturing the digital overdenture may be performed through a digital overdenture manufacturing system including an imaging device, a planning portion, and a manufacturing apparatus.

Here, the imaging device is configured to obtain surface information m2 and m3 and alveolar bone information A on the target arch and the opposing arch and may be preferably understood as a concept including an oral scanner and a computerized tomography (CT) imaging device. That is, a three-dimensional (3D) image of the surface information m2 and m3 on outer surfaces of gum parts of the target arch and opposing arch is obtained using the oral scanner. Also, the alveolar bone information A, which allows a shape and a curve of an alveolar bone and a position of a lower alveolar nerve to be checked, is obtained using the CT imaging device.

Also, the planning portion may be preferably understood as a computer device which collects, calculates, and models information obtained using the imaging device and information prestored in the planning portion. That is, the surface information m2 and m3 on the target arch and the opposing arch and the alveolar bone information A which are obtained using the imaging device are loaded on the planning portion and displayed as a 3D image. Also, the surface information m2 and m2 and the alveolar bone information A may be arranged corresponding to a preset vertical dimension VD and generated as a planning image M for designing the overdenture. Here, each piece of the surface information m2 and m3 and the alveolar bone information A may be matched on the basis of comparative regions mutually matched corresponding to the arches. For example, the opposing arch may be may be matched with a comparative region such as the surface, interdental gap, or the like of residual teeth, and the target arch may be attached to an alignment marker and matched with an image of the alignment marker displayed on each piece of information as the comparative region.

In addition, the surface information m2 and m3 and the alveolar bone information A may be aligned through a scanned image for a combined bite which guides a vertical dimension VD of a patient or a scanned image for an oral cavity in which the combined bite is installed. The combined bite may be preferably understood as a height that is compensated through an occlusal pressure while being occluded between the target arch and the opposing arch.

Here, the planning image M includes flattening information C aligned with the alveolar bone information A in a horizontal direction and a plurality of pieces of implantation information B of fixtures arranged inside the alveolar bone information A set to be arranged such that top ends thereof correspond to the flattening information C.

Here, the alveolar bone information A may be preferably set to be spaced downward (upward in the case of an upper jaw) from an outermost end of the alveolar bone information A in consideration of a volume of the holder device fixed to the target arch in order to install the digital overdenture in the oral cavity. Also, the implantation information B may be preferably disposed on the anterior teeth side in consideration of a position of the lower alveolar nerve K. As described above, when the implantation information B is disposed on the anterior teeth side, a complicated and precise drilling process for implanting a fixture into an alveolar bone on a molar tooth side to be inclined is not necessary such that convenience in treatment may be significantly improved.

Also, the manufacturing apparatus may be preferably understood as a three-dimensional printer or molding apparatus which manufactures a real digital overdenture according to design information of the digital overdenture. Hereinafter, the manufacturing apparatus may be preferably understood as a 3D printer. In addition, the surgical guide, the flattening guide, and the temporary denture may also be three-dimensionally printed using the manufacturing apparatus. The 3D printer may be preferably provided as a digital light processing (DLP) type stereolithographic printer which cures a cross section patterned by light energy of a lamp or a light emitting diode (LED). Through this, each component being three-dimensionally printed may be precisely printed with a minimum error from design information set on the basis of the planning image M. Accordingly, an operation of additionally compensating the printed component may be substantially omitted such that manufacturing convenience and quickness may be further improved.

FIG. 3 is an exemplary view illustrating a process of designing a flattening guide in the method of manufacturing the digital overdenture according to one embodiment of the present invention, and FIGS. 4A and 4B are exemplary views illustrating the flattening guide in the method of manufacturing the digital overdenture according to one embodiment of the present invention. FIG. 5 is an exemplary view illustrating a surgical guide in the method of manufacturing the digital overdenture according to one embodiment of the present invention, and FIG. 6 is an exemplary view illustrating a process of manufacturing an alignment piece using an impression model in the method of manufacturing the digital overdenture according to one embodiment of the present invention. FIGS. 7A and 7B are exemplary views illustrating a state in which a holder device is set in the method of manufacturing the digital overdenture according to one embodiment of the present invention, and FIG. 8 is an exemplary view illustrating a process of correcting a temporary denture in the method of manufacturing the digital overdenture according to one embodiment of the present invention. FIG. 9 is an exemplary view illustrating a process of obtaining a corrected-scanned image in the method of manufacturing the digital overdenture according to one embodiment of the present invention, and FIG. 10 is an exemplary view illustrating a process of obtaining design information in the method of manufacturing the digital overdenture according to one embodiment of the present invention. FIGS. 11A and 11B are exemplary views illustrating a process of fixing a clip in the method of manufacturing the digital overdenture according to one embodiment of the present invention.

As shown in FIGS. 3 to 11B, design information on the surgical guide 20, the flattening guide 10, and impression models 2A and 3A is obtained on the basis of the planning image M (refer to FIG. 2). Also, each piece of the design information is transmitted to the manufacturing apparatus such that the surgical guide 20, the flattening guide 10, and the impression models 2A and 3A are really manufactured.

Here, the flattening guide 10 may be preferably understood as an auxiliary device used for flattening an alveolar bone of the target arch corresponding to the alveolar bone information A. In detail, the flattening guide 10 includes a shape-coupling groove portion 11, a stopper connecting portion 13, and a flattening anchor fixing portion 14. Here, the shape-coupling groove portion 11 may be preferably formed while being divided into both ends such that inner surfaces 11a thereof are shape-matched with outer surfaces of gums of molar sides of the target arch. Also, the stopper connecting portion 13 may connect each outer end and each inner end of the shape-coupling groove portion 11 while an opening portion 12 through which the alveolar bone of the target arch passes and is exposed outward is preferably formed.

Here, a flattening guide surface 13a may be preferably formed on a top surface of the stopper connecting portion 13 to guide a movement region of a flattening device. That is, one side of the flattening device is moved leftward and rightward while being mounted on the flattening guide surface 13a such that the alveolar bone exposed through the opening portion 12 is flattened. Here, a movement region of the flattening device is restricted by boundary surfaces 11b protruding in the opening portion 12 of the shape-coupling groove portion 11, and a movement depth is restricted by flattening guide surfaces 13a.

In addition, the flattening anchor fixing portion 14 may be preferably provided along a side part of any one side of the shape-coupling groove portion 11 and the stopper connecting portion 13. That is, an anchor pin P passes through the flattening anchor fixing portion 14 and is fixed to the target arch. Accordingly, movement of the flattening guide 10 caused by vibrations generated during a process of flattening the alveolar bone using a flattening device such as a drill and the like is prevented. Through this, the alveolar bone may be flattened to coincide with the flattening information C (refer to FIG. 2) such that preciseness in dental restoration may be significantly improved according to a dental restoration plan established on the basis of the planning image M.

Design information m10 of the flattening guide may be established on the basis of the alveolar bone information A and the flattening information C (refer to FIG. 2) of the planning image M.

In detail, referring to FIG. 3, an outer edge m10a of the design information m10 of the flattening guide is set to cover an entirety of inner and outer surfaces of the alveolar bone information A. Also, an operation of setting an inner surface m11a to correspond to and be shape-matched with a surface of the alveolar bone information A may be included. Also, the opening portion m12 is set along a boundary region E (refer to FIG. 2) formed by alternating the flattening information C (refer to FIG. 2) with the alveolar bone information A. That is, a space between the boundary region E (refer to FIG. 2) and the outer edge on the anterior teeth side except the opening portion m12 is set as the stopper connecting portion m13, and molar teeth side regions are set as the shape-coupling groove portion m11. Here, since pieces of the implantation information B are aligned exclusively to the anterior teeth side, the boundary region E (refer to FIG. 2) may be set to include an entire outline of an implantation region in which the pieces of the implantation information B are aligned.

Here, the flattening information C (refer to FIG. 2) is vertically spaced from an outermost part of the alveolar bone information A such that a boundary surface m11b protruding between the opening portion m12 and the shape-coupling groove portion m11 is formed. Through this, the boundary surface m11b and a top surface of the stopper connecting portion m13 may function as a movement restriction engaging portion of the flattening device.

In addition, in order to fasten the anchor pin, an operation of setting at least one flattening anchor fixing portion m14 along a side portion of the outer edge m10a is included in a design. Here, the flattening anchor fixing portion m14 is set on the basis of anchor pin information D preset in the planning image M. Here, the anchor pin information D is designed in consideration of the position of the lower alveolar nerve K. Accordingly, even when the real flattening guide 10 is installed in the oral cavity, it is possible to prevent the nerve from being damaged by the anchor pin P. Also, referring to FIG. 5, the surgical guide 20 may be preferably understood as an auxiliary device used for implanting the fixture into the alveolar bone corresponding to the implantation information B. Here, the surgical guide 20 includes a fixing groove portion 21, a guide hole 22, and a surgical anchor fixing portion 24.

In detail, the fixing groove portion 21 may be preferably formed to be shape-matched with the target arch. Here, a process of flattening the alveolar bone is previously performed to implant the fixture. Accordingly, an inner surface part of the surgical guide 20 may be preferably formed to be shape-matched with a flattened surface of the alveolar bone flattened corresponding to the flattening information C (refer to FIG. 2).

Also, the guide hole 22 may be preferably formed passing therethrough corresponding to the implantation information B. Here, a drilling process of forming an implantation hole into the flattened alveolar bone is previously performed to implant the fixture. Through this, a diameter of the guide hole 22 is formed to correspond to an outer diameter of an end part of a drilling device for drilling and implanting the fixture. Here, to reduce and prevent a frictional force and deformation caused by rotation of the drilling device, a brass sleeve 23 may be preferably fastened to the surgical guide 20. That is, the guide hole 22 may be preferably understood as being formed in the sleeve 23. Additionally, one or more of such surgical anchor fixing portions 24 may be preferably provided along the side part of the surgical guide 20 such that the anchor pin P passes therethrough and is fixed to the target arch.

The surgical guide 20 is designed on the basis of a 3D image of each piece of information displayed on the planning image M (refer to FIG. 2). In detail, the surgical guide 20 is formed by setting an inner surface portion corresponding to the flattening information C (refer to FIG. 2) to be shape-matched with the alveolar bone flattened by the flattening guide 10 and forming the guide hole 22 corresponding to the implantation information B. Also, an operation of setting at least one surgical anchor fixing portion 24 to fasten the anchor pin P is included.

Here, the surgical anchor fixing portion 24 may be preferably formed in a position corresponding to the flattening anchor fixing portion 14. That is, the flattening guide 10 and the surgical guide 20 are designed using the same information included in the planning image M (refer to FIG. 2). Accordingly, the flattening anchor fixing portion 14 and the surgical anchor fixing portion 24 are set and manufactured in positions corresponding to each other. In detail, after the process of flattening the alveolar bone using the flattening guide 10, implantation of the fixture is performed. Accordingly, in a process of separating the flattening guide 10 and sequentially installing the surgical guide 20, when the anchor pin P is implanted into an anchor hole preformed in the target arch, the anchor pin P may be fixed to a precise position according to a preestablished dental restoration plan.

Meanwhile, referring to FIGS. 4B to 8, the impression models 2A and 3A are manufactured by being three-dimensionally printed on the basis of the planning image. Here, the impression models 2A and 3A include a target side impression model 2A manufactured on the basis of a 3D image of the target arch and an opposing side impression model 3A manufactured on the basis of a 3D image of the opposing arch.

In detail, a temporary anchor matching groove 2d may be preferably formed in a position of the target side impression model 2A corresponding to the anchor pin information D. In addition, in the target side impression model 2A, a temporary flattened surface 2c corresponding to the flattening information C (refer to FIG. 2) and a temporary implantation hole 2e inside the temporary flattened surface 2c corresponding to the implantation information B (refer to FIG. 3) may be formed. In the target side impression model 2A, the temporary flattened surface 2c and the temporary implantation hole 2e are designed according to a plan established on the basis of each piece of the information included in the planning image and are manufactured by being three-dimensionally printed through the manufacturing apparatus.

As described above, unlike a conventional case in which a mold is manufactured using an impression obtained through an oral cavity of a patient and an impression model is manufactured, the present invention is manufactured on the basis of digital information based on a scanned image and a CT image for an oral cavity. Accordingly, each of the impression models 2A and 3A may be quickly manufactured while a matching degree of the digital impression model and a real oral cavity may be significantly improved. Through this, when the preciseness of a variety of guides, temporary denture, and the like is checked and corrected, the impression models may be used instead of the real oral cavity.

Also, the manufactured flattening guide 10 is temporarily installed in the target side impression model 2A while the anchor pins P passes through the flattening anchor fixing portion 14 and is fastened to the temporary anchor matching groove 2d such that a position thereof is aligned. Here, it is possible to check whether the flattening guide 10 is defective by comparing positions of the temporary flattened surface 2c and the opening portion 12 with each other while the flattening guide 10 is fastened. Also, the surgical guide 20 is temporarily installed in the target side impression model 2A while the anchor pins P passes through the surgical anchor fixing portion 24 and is fastened to the temporary anchor matching groove 2d such that a position thereof is aligned. Here, it is possible to check whether the surgical guide 20 is defective by comparing positions of the temporary implantation hole 2e and the guide hole 22 with each other while the surgical guide 20 is fastened.

Meanwhile, in order to align the flattening anchor fixing portion 14 corresponding to the anchor pin information D, it is preferable to further manufacture a flattening alignment piece (not shown) having one surface shape-matched with an end part of the opposing arch and having the other surface shape-matched with an outer end of the opening portion 12. In addition, in order to align the surgical anchor fixing portion 24 corresponding to the anchor pin information D, it is preferable to further manufacture a surgical alignment piece 50 having one surface shape-matched with an end part of the opposing arch and having the other surface shape-matched with an outer end of the guide hole 22.

Here, basically, manufacturing methods and components of the flattening alignment piece and the surgical alignment piece 50 are equal except a configuration in which the other surfaces thereof are shape-matched with the opening portion 12 and the guide holes 22. Accordingly, hereinafter, a process of manufacturing the surgical alignment piece 50 will be described and illustrated as an example.

In detail, the surgical alignment piece 50 may be manufactured using the target side impression model 2A and the opposing side impression model 3A. Here, the target side impression model 2A and the opposing side impression model 3A are spaced apart and aligned corresponding to the vertical dimension through bite alignment guides 2B and 3B. Here, the bite alignment guides 2B and 3B may be preferably understood as being designed and manufactured on the basis of the planning image M (refer to FIG. 2). Here, the bite alignment guides 2B and 3B are integrated with the impression models 2A and 3A, respectively, while end parts thereof may be connected or separately manufactured and fastened to the impression models 2A and 3A.

Also, the surgical guide 20 is disposed and temporarily installed above the target side impression model 2A, and a dental resin is injected into a gap between the opposing side impression model 3A and the surgical guide 20. Here, the dental resin may be provided as putty for impression. In detail, the putty for impression is injected and cured to be partially overlapped with ends of the opposing side impression model 3A and the surgical guide 20 which face each other such that the surgical alignment piece 50 may be manufactured. Through this, a first bite groove 53 shape-matched with the opposing arch and an end part of the opposing side impression model 3A and a second bite groove 52 shape-matched with an end part of the guide hole 22 are formed on the surgical alignment piece 50.

The flattening alignment piece and the surgical alignment piece 50 may be designed and manufactured on the basis of the planning image M (refer to FIG. 2). That is, the outer surfaces of the flattening alignment piece and the surgical alignment piece 50 may be manufactured to be shape-matched with the opening portion 12 and the guide hole 22 on the basis of design information of the flattening guide 10 and the surgical guide 20 set through the planning image M (refer to FIG. 2). Also, one surfaces of the flattening alignment piece and the surgical alignment piece 50 may be manufactured to be shape-matched with end parts of the opposing arch on the basis of the surface information m3 (refer to FIG. 2) of the opposing arch displayed in the planning image M (refer to FIG. 2).

Also, the one surface of the flattening alignment piece is shape-matched with the opposing arch and the other surface thereof is shape-matched with the opening portion 12 of the flattening guide 10. Accordingly, the flattening guide 10 is disposed to guide a flattening plan preestablished in the planning image M (refer to FIG. 2). Here, when a natural tooth or a preinstalled artificial tooth remains in the opposing arch, it is preferably understood that the flattening guide 10 is installed after extracting the natural tooth or the preinstalled artificial tooth. Also, when the anchor pin P is fixed through the flattening anchor fixing portion 14, movement of the flattening guide 10 is prevented during a process of flattening the alveolar bone using the flattening device and the alveolar bone is flattened to a precise thickness.

Subsequently, occlusion is performed in the oral cavity such that the one surface of the surgical alignment piece 50 is shape-matched with the opposing arch and the other surface thereof is shape-matched with the guide hole 22 of the surgical guide 20. Through this, the surgical guide 20 is disposed in a position to implant the fixture according to the implantation plan preestablished in the planning image M (refer to FIG. 2). Also, when the anchor pin P is fixed through the surgical anchor fixing portion 24, movement of the surgical guide 20 is prevented during processes of drilling using the drilling device and implanting the fixture. Additionally, the surgical anchor fixing portion 24 is formed on the basis of the same anchor pin information D (refer to FIG. 2) as that of the flattening anchor fixing portion 14. Accordingly, as soon as an end part of the anchor pin P passing through the surgical anchor fixing portion 24 is fixed to an anchor groove formed in the opposing arch to fix the flattening guide 10, a position of the surgical guide 20 may be automatically aligned.

As described above, according to the present invention, not only design information of the digital overdenture 60 but also design information of the flattening guide 10 and the surgical guide 20 which guide a previous process of installing the digital overdenture 60 in the oral cavity are obtained at the same time. Also, since the flattening guide 10 and the surgical guide 20 are designed and manufactured on the basis of the same information included in the planning image M (refer to FIG. 2), the processes of flattening the alveolar bone, drilling, and implanting the fixture may be accurately and precisely guided.

In addition, the flattening guide 10 and the surgical guide 20 may check whether a defect is present using the target side impression model 2A and the opposing side impression model 3A which are manufactured together on the basis of the planning image M (refer to FIG. 2). Additionally, the flattening alignment piece and the surgical alignment piece 50 may be prepared using the planning image M or the bite alignment guides 2B and 3B manufactured on the basis of the planning image M (refer to FIG. 2).

Through this, it is possible to fix a problem of a conventional apparatus in which an impression of an oral cavity is obtained, a mold is manufactured on the basis thereof, and an impression model is manufactured such that an excessive time is consumed in a preparing operation. Also, according to the present invention, the impression models 2A and 3A are manufactured by being three-dimensionally printed on the basis of surface information obtained by scanning the oral cavity. Accordingly, an error between the three-dimensionally printed impression models 2A and 3A and the real oral cavity may be minimized, and manufacturing may be quickly performed through a 3D printer. Through this, a gum that is soft tissue is pressurized while the impression is obtained such that a problem of a conventional apparatus in which the impression models 2A and 3A differ from the real oral cavity may be fixed.

Additionally, the impression models 2A and 3A, the flattening guide 10, the surgical guide 20, and each of the alignment pieces are designed on the basis of the planning image M (refer to FIG. 2) and manufactured by being printed through the 3D printer. Accordingly, a time consumed in the preparing operation for manufacturing the digital overdenture 60 is minimized and the overall time for dental restoration using the digital overdenture 60 is significantly reduced such that the discomfort of a patient may be minimized.

Meanwhile, when flattening of the alveolar bone and implanting of the fixture are completed, the holder device 40 may be preferably fixed to the fixture. Here, the holder device 40 includes a holder abutment 41 with a through hole 42 formed in one side thereof and a fixing bar 43 fastened along the through hole 42.

In detail, the fixing bar 43 is provided to be curved corresponding to a line which virtually connects positions at which the plurality of fixtures are implanted along the target arch. Also, the holder abutment 41 includes a fastening portion 41b inserted into a top end of the fixture and a holder portion 41a protruding above the fixture and exposed. Here, when a pressurizing screw 41d is fastened to a fastening hole 41c of the holder abutment 41 while the fixing bar 43 passes through the through hole 42, an inner circumference of the through hole 42 is decreased such that the fixing bar 43 may be forcibly fixed.

Here, the holder device 40 may be preliminarily installed on the target side impression model 2A before being directly installed on the target arch. That is, the holder device 40 may be set and prepared by preliminarily installing the holder abutment 41 and the fixing bar 43 on the target side impression model 2A so as to be quickly and easily fastened to the real oral cavity.

In detail, an analog 4 is fixed to the temporary implantation hole 2e formed in the target side impression model 2A, and the holder abutment 41 is fastened to the analog 4. Also, the fixing bar 43 passes through the through hole 42 and is fixed through the pressurizing screw 41d. Through this, the holder device 40 is set and prepared. Here, the temporary implantation hole 2e is formed in the temporary flattened surface 2c formed corresponding to the flattening information C (refer to FIG. 2) such that an implantation height is aligned. Also, a position of the temporary implantation hole 2e is aligned on the basis of the implantation information B (refer to FIG. 2). Accordingly, the holder device 40 may be set and prepared on the basis of the implantation plan preestablished on the basis of the planning image M (refer to FIG. 2).

In addition, the position of the temporary implantation hole 2e is set to be equal to a position of the guide hole 22 formed in the surgical guide 20. Through this, when the holder device 40 is disposed at a top end of the fixture implanted into the real oral cavity while being set and prepared, the fastening portion 4 1b of the holder abutment 41 may be automatically aligned with the top end of the fixture. Accordingly, the discomfort of a patient in opening his or her mouth for a long time to separately fasten the holder abutment 41 and fix the fixing bar 43 and a difficulty in installing the holder device due to a narrow oral cavity in conventional apparatuses may be fundamentally removed.

Meanwhile, there is prepared the temporary denture 30 which is corrected to form a temporary holder insertion portion 35 where the holder device 40 is inserted into and shape-matched with. Here, the temporary denture 30 may be preferably corrected using the target side impression model 2A on which the holder device 40 is preliminarily installed.

In detail, referring to FIG. 8, the temporary denture 30 includes a temporary tooth portion 32 having an outer surface occluded with the opposing arch, a denture body portion 31 formed by integrating the temporary tooth portion 32 with a temporary gum portion 33, and a shape-matched correction groove portion 34 formed on an inner side of the denture body portion 31.

Here, the denture body portion 31 may be preferably provided while being normalized for general use corresponding to a preset standard dental arch profile. Here, the standard dental arch profile may be preferably understood as a shape in which a virtual arc-shaped line or a virtual area corresponding to a real teeth arrangement extends. The standard dental arch profile may be calculated while being standardized in consideration of anatomical deviations for age and gender and set while being normalized for each stage to be commonly applied to a variety of oral cavities of patients. For example, the denture body portion 31 may be prepared as ready-made articles normalized in large/medium/small.

In addition, the denture body portion 31 may be pre-manufactured as a real product but may be more preferably prepared as 3D design information corresponding to the denture body portion 31. Accordingly, the design information of the denture body portion 31 may be prestored in the planning portion and may be three-dimensionally printed through the manufacturing apparatus. Through this, an additional space for storing the real denture body portion 31 is not necessary and the denture body portion 31 may be prevented from being deformed or contaminated due to being exposed for a long time.

Here, the denture body portion 31 may be preferably formed by three-dimensionally printing a material which is softened when being heated to a preset temperature or higher such that the temporary gum portion 33 side is pressurized and deformed corresponding to the vertical dimension VD through an occlusal pressure. For example, the denture body portion 31 is formed of a base resin including an acrylic oligomer. Also, the denture body portion 31 formed by three-dimensionally printing the base resin, that is, an inner surface of the temporary gum portion 33 is immersed in hot water heated at a temperature within a softening temperature range of 60 to 70° C. and heated to be softened.

Also, the heated denture body portion 31 is installed between the target side impression model 2A and the opposing side impression model 3A and an occlusal pressure is applied thereto. Here, the temporary gum portion 33 softened by heating may be preliminarily deformed to correspond to the vertical dimension VD (refer to FIG. 2) and a dental arch of the target arch. As described above, since the denture body portion 31 is normalized for general use, a high-level skill is not necessary for design and manufacturing. Since the denture body portion 31 is easily corrected to fit an oral cavity for each patient even when being normalized, preciseness thereof may be significantly improved.

Here, the temporary tooth portion 32 is formed as a tooth shape in which a morsal surface and an interdentium, which are preset to be occluded with the opposing arch are displayed. Also, the temporary gum portion 33 may integrally extend from the temporary tooth portion 32 while a marginal groove 33a may be preferably formed on an inner surface side to surround the target arch while being spaced apart therefrom. Since the denture body portion 31 is integrally formed as described above, manufacturing is simplified. Also, it is possible to fundamentally fix a problem of a conventional apparatus in which while the temporary tooth portion and the temporary gum portion are separately manufactured and assembled, an assembled part is damaged by an occlusal pressure or horizontally slides and is separated.

Here, the marginal groove 33a may be preferably formed to be recessed toward the temporary tooth portion 32 in consideration of a protruding volume of the holder device 40 installed in the alveolar bone. Also, the marginal groove 33a is filled with a dental resin and is disposed above the target side impression model 2A on which the holder device 40 is preliminarily installed while being pressurized by the occlusal pressure. Here, the dental resin filled in the marginal groove 33a may be preferably understood as a relining resin. Through this, the temporary holder insertion portion 35 corresponding to an external shape of the holder device 40 is formed to be engraved into the relining resin and cured. The temporary holder insertion portion 35 formed as described above is utilized as design information m65 of the holder insertion portion 65 of the digital overdenture 60 which will be described below. Also, when the temporary denture 30 is temporarily used instead of the digital overdenture 60, the temporary denture 30 may be utilized as a coupling area inserted into the holder device 40 and temporarily fixed thereto.

Meanwhile, the temporary denture 30 is manufactured and corrected through a series of processes as follows. In detail, design information on one denture body portion 31 appropriate for an oral cavity of a patient is selected and extracted from a digital library and is transmitted to the manufacturing apparatus to be three-dimensionally printed. Also, the three-dimensionally printed denture body portion 31 may be preliminarily exposed to curing light for 30 to 60 seconds and semi-cured. Here, the curing light may be preferably understood as ultraviolet (UV) light within a UV-A range having a wavelength of, particularly, 300 to 400 nm. Here, being preliminarily exposed may be preferably understood as being exposed to the curing light to be light-cured to be softened when being heated within the softening temperature range while supporting the occlusal pressure instead of completely curing the denture body portion 31.

That is, when the denture body portion 31 is exposed to the curing light for a short time, an inner surface of the temporary gum portion 33 is heated and semi-cured to be softenable so as to be primarily corrected to be preliminarily shape-matched corresponding to the target arch. Here, preliminary shape-coupling may be preferably understood as shape-coupling for forming a stable occlusion relationship with respect to the opposing arch while being installed even though not being precisely shape-matched with the target arch.

Also, the inner surface of the preliminarily cured denture body portion 31 is heated within the softening temperature range and is installed between the target side impression model 2A and the opposing side impression model 3A to be occluded. Through this, the denture body portion 31 normalized for general use may be primarily corrected to have a size and a height more appropriate for the oral cavity of the patient. Here, the target side impression model 2A used in primarily correcting the denture body portion 31 may be formed to have a shape before the alveolar bone is flattened. That is, the target side impression model 2A may further include a top end (part shown as 2g in FIG. 4B) of the alveolar bone with a curve before flattening. Accordingly, damage or a scratch to the inner surface of the denture body portion 31 caused by the holder device 40 may be minimized.

Subsequently, the primarily corrected denture body portion 31 may be exposed to the curing light for 4 to 5 minutes and completely cured. Here, complete curing may be preferably understood as irreversibly curing the denture body portion 31 so as not to be softened or deformed not only at the occlusal pressure but also at a temperature above the softening temperature range. Also, the marginal groove 33a is filled with the relining resin, and the holder device 40 is installed on the preliminarily installed target side impression model 2A. Here, the target side impression model 2A may be preferably understood as including both the temporary flattened surface 2c and the temporary implantation hole 2e. Through this, the temporary holder insertion portion 35 engraved into the relining resin corresponding to an external shape of the holder device 40 is formed.

Here, a process of curing using curing light in a process of correcting the temporary denture 30 is divided into multiple stages. Accordingly, when the temporary denture 30 is heated, the temporary denture 30 may be prevented from being deformed in an entire shape thereof during a correction stage while being easily corrected to fit the oral cavity. Also, a difficulty in correcting the temporary denture 30 may be fundamentally removed by completely light-curing right after 3D printing. As described above, the denture body portion 31 is three-dimensionally printed while being simply normalized as an integral form for general use. Here, the denture body portion 31 is corrected to fit a dental arch and a vertical dimension of a patient during multiple curing processes to stably sustain an occlusal pressure. Accordingly, a synergistic effect of improving preciseness in shape-coupling the temporary denture 30 with the oral cavity and supporting strength of the temporary denture 30 may be provided.

Meanwhile, referring to FIGS. 8 to 10, a height is pressurized and deformed corresponding to the vertical dimension VD (refer to FIG. 2) and an entirety of the inner and outer surfaces of the temporary denture 30 corrected so as to engrave the temporary holder insertion portion 35 in an inner side of the shape-matched correction groove portion 34 is scanned. Through this, an auxiliary scanned image m30 is obtained. Also, a corrected-scanned image m30A swapped such that 3D surface information of the temporary holder insertion portion 35 is exposed outward may be preferably obtained from the auxiliary scanned image m30.

In detail, the auxiliary scanned image m30 is transmitted to the planning portion, and a boundary line X is set between 3D surface information of the temporary gum portion and 3D surface information of the temporary tooth portion. Here, the boundary line X may be preferably set along an outer side of an inner surface part of the temporary gum portion. Also, an inner surface side of the boundary line X is set as a fastening region portion, and the 3D surface information of the temporary denture except the fastening region portion is set as an elimination region m39. Subsequently, the elimination region m39 is eliminated and inner side surface information of the temporary holder insertion portion is swapped to be exposed outward so as to obtain the corrected-scanned image m30A. That is, the corrected-scanned image m30A may be preferably understood as image information in which only 3D surface information m33 of the inner part including 3D surface information m35 of the temporary holder insertion portion is displayed in the auxiliary scanned image m30.

Here, the 3D surface information included in the auxiliary scanned image m30 is stored as surface information substantially having no thickness. Accordingly, in the auxiliary scanned image m30A, coordinate values for an inner side contour and coordinate values for an outer side contour are substantially equal to each other. Accordingly, the 3D surface information m35 of the temporary holder insertion portion may be displayed as a shape in which the holder device 40 is insertable. Also, an inner side part of the digital overdenture 60 is set on the basis of the corrected-scanned image m30A including the 3D surface information of the temporary holder insertion portion 35.

As described above, in the present invention, design information about the inner side part of the digital overdenture 60 into which the holder device 40 is inserted is obtained on the basis of a scanned image of the temporary denture 30 corrected to form the temporary holder insertion portion 35. Here, since the temporary holder insertion portion 35 is engraved as the real holder device 40 is pressurized, the holder insertion portion 65 designed and manufactured on the basis of the 3D surface information m35 of the temporary holder insertion portion 35 may be formed at a precise position.

In addition, the temporary denture 30 may be scanned through a fixed type scanner. That is, since it is possible to scan an entirety of inner and outer surfaces of the temporary denture 30 without moving a scanner or the temporary denture 30, distortion of the corrected-scanned image m30A is minimized Through this, preciseness in designing and manufacturing the digital overdenture 60 and a degree of shape-coupling with the oral cavity may be further improved.

Here, design information m60 of the digital overdenture may be preferably obtained through a series of processes as follows.

First, a virtual artificial tooth portion and a virtual artificial gum portion are extracted from the digital library and virtually arranged in the planning image M (refer to FIG. 2). Here, an inner surface of the virtual artificial gum portion may be preferably swapped in the corrected-scanned image m30A. Also, the corrected-scanned image m30A may be preferably corrected to be replaced with a virtual holder device m40 extracted from the digital library to be matched.

Here, the digital library may be preferably understood as a database in which basic external shape information of a component used for dental restoration is stored as 3D vector data. The digital library includes a plurality of pieces of digital external shape information about a real holder abutment, a real fixing bar, and a real fixture. In addition, the digital library includes a plurality of pieces of digital external shape information about the temporary denture and the digital overdenture. Also, an optimized piece of digital external shape information for the oral cavity of each patient may be extracted from the plurality of pieces of digital external shape information and virtually disposed in the planning image M (refer to FIG. 2).

In detail, the virtual artificial gum portion and the virtual artificial tooth portion are extracted from the digital library and virtually arranged between the surface information m2 and m3 (refer to FIG. 2) of target arch and the opposing arch. Here, the surface information m2 (refer to FIG. 2) of the target arch and the corrected-scanned image m30A are arranged to be aligned on the basis of a mutual common part while an inner side part contour of the virtual artificial gum portion is swapped in the corrected-scanned image m30A. Here, swapping may be preferably understood as a preset image that is substituted or exchanged with another image or a modified image according to image processing.

Also, the virtual holder device m40 corresponding to the holder device is extracted from the digital library. Here, the virtual holder device m40 may be preferably extracted as digital external shape information corresponding to a state in which a plurality of such holder abutments and the fixing bar connected therethrough are set as one. Also, in a state of being virtually disposed in the planning image M (refer to FIG. 2), positions of virtual holder abutments and a virtual fixing bar may be separately adjusted to calculate and match a comparative region with the corrected-scanned image m30A.

Here, when the virtual holder device m40 and the corrected-scanned image m30A are matched with each other, the 3D surface information m35 of the temporary holder insertion portion in the corrected-scanned image m30A is corrected instead of the holder device m40. Accordingly, unevenness, notches, and air holes generated as the temporary holder insertion portion 35 is pressurized by the holder device 40, or distortion or damage capable of occurring during a scanning process is removed. Through this, a position of the holder insertion portion 65 into which the holder device 40 is inserted is aligned on the basis of the corrected-scanned image m30A while a shape may be clarified and precisely formed on the basis of the virtual holder device m40.

Here, a virtual clip m67 may be virtually disposed on the virtual holder device m40. Also, a virtual fixing hole m66 to be matched with the virtual clip m67 is set while design information m60 of the digital overdenture is generated. As described above, in the present invention, a dental restoration plan such as flattening of the alveolar bone, implantation of the fixture, design of the temporary denture and the digital overdenture is established on the basis of the digital external shape information stored in the digital library, and the surface information and alveolar bone information obtained from the real oral cavity. Also, preciseness of the holder device 40 and auxiliary devices used in the process of manufacturing the digital overdenture may be previously checked using the impression models 2A and 3A corresponding to the oral cavity.

Through this, a patient only requires a minimum of visits such as for scanning and CT-image capturing an oral cavity, implanting the fixture and the holder device 40, and finally installing the digital overdenture 60. Also, since auxiliary devices necessary for each stage and the temporary denture are quickly manufactured through 3D printing on the basis of information prestored in the digital library, only a minimum working time is consumed in a visit to a practitioner. Accordingly, a problem of a conventional apparatus in which a patient should frequently visit and open his or her mouth for a long time may be fundamentally removed. In addition, since accurate design information of the digital overdenture 60 is obtained through the corrected temporary denture 30 while the temporary denture 30 is temporarily usable during a manufacturing period of the digital overdenture 60, patient convenience may be further improved.

Meanwhile, referring to FIGS. 10 to 11B, the design information m60 of the digital overdenture is transmitted to the 3D printer and three-dimensionally printed such that a real digital overdenture 60 is manufactured. Here, the digital overdenture 60 includes an artificial tooth portion and an artificial gum portion while the holder insertion portion 65 is formed on an inner surface side of the artificial gum portion to be recessed. In addition, the real fixing hole 66 is formed on the basis of the virtual fixing hole m66 to pass therethrough.

Here, the digital overdenture 60 may be provided such that the artificial gum portion and the artificial tooth portion are separated and assembled. As necessary, the artificial gum portion and the artificial tooth portion may be integrally formed. Here, when the artificial tooth portion and the artificial gum portion are separately manufactured and assembled, each part may be manufactured using different materials. In addition, in the digital overdenture 60, the artificial gum portion and the artificial tooth portion are three-dimensionally printed while a color-forming layer of a preset color may be further applied to surfaces thereof and cured. Through this, the digital overdenture 60 having significantly improved aesthetics and high quality may be provided by matching with a color of the oral cavity.

Meanwhile, the clip 67 may be preferably fixed to an inside of the fixing hole 66 so as to detachably fasten the digital overdenture 60 to the holder device 40. Here, the clip 67 may be fixed to the inside of the fixing hole 66 through the following process.

In detail, the set and prepared holder device 40 is fixed to the fixture implanted into the alveolar bone. Here, the clip 67 is fastened to one side of the fixing bar 43 fixed by passing the holder abutment 41. Here, the clip 67 may be preferably installed corresponding to a position of the virtual holder device m40 at which the virtual clip m67 is virtually disposed. To this end, a mark corresponding to the position at which the virtual clip m67 is disposed may be displayed on the fixing bar 43.

Also, the digital overdenture 60 is installed in the target arch 2 such that the holder device 40 is to be inserted into the holder insertion portion 65. Here, the holder insertion portion 65 includes a first shape-coupling portion 65a corresponding to an outer surface shape of the holder abutment 41 and a second shape-coupling portion 65b corresponding to an outer surface shape of the fixing bar 43.

Accordingly, when the holder device 40 is inserted into the holder insertion portion 65, they are restrained by a step between the first shape-coupling portion 65a and the second shape-coupling portion 65b such that forward, backward, leftward, and rightward movements may be restricted. Also, the fixing hole 66 is set on the basis of the virtual clip 67 virtually disposed in the planning image M (refer to FIG. 2). Accordingly, a diameter of the fixing hole 66 may be compactly formed with a minimum error interval with respect to an entire size of the clip 67.

Here, a position at which the clip 67 is fastened to the fixing bar 43 is checked through the fixing hole 66 and a curable resin r is injected into the fixing hole 66 and cured such that the clip 67 is fixed to the fixing hole 66. Here, the curable resin r may be formed of the same material as a material used for manufacturing the digital overdenture 60. Through this, the same materials may be firmly fixed through a high level of adhesion. In addition, a rubber dam portion disposed to cover a surface of the target arch 2 may be further provided to prevent the curable resin r from flowing down into the oral cavity through the fixing hole 66. The rubber dam portion may be provided as a thin flexible rubber plate and may be preferably understood as being separated from the target arch 2 after the curable resin r is injected.

In addition, the digital overdenture 60 may be manufactured further including a process in which the relining resin is applied to and occluded with the inner surface part thereof through an occlusal pressure. Since the digital overdenture 60 is more precisely shape-matched through this, when the digital overdenture 60 is installed in the oral cavity of the patient and then chewing is performed, the movement, shaking, and separation of the digital overdenture 60 may be prevented.

According to the present invention, effects are provided as follows.

First, a highly precise dental restoration plan for a patient is established on the basis of images obtained by scanning and CT-image capturing an oral cavity and digital external shape information prestored in a digital library. Also, a variety of guides, a temporary denture, and a digital overdenture designed and three-dimensionally printed according to the established plan can be accurately and precisely installed in the oral cavity.

Second, preciseness of the guides, the temporary denture, and the digital overdenture is checked and corrected through digital impression models formed by three-dimensionally printing the images for the oral cavity. Accordingly, since dental restoration is precisely performed with a minimum number of visits such as obtaining oral cavity information, implanting a fixture and a holder device, and final installation of the digital overdenture, inconvenience can be minimized.

Third, in the temporary denture, a denture body portion is simply normalized as an integral form for general use and three-dimensionally printed while the denture body portion is cured through multiple stages to stably sustain an occlusal pressure. The temporary denture is corrected to fit a dental arch and a vertical dimension of the patient through such a curing process such that an increased effect of improving the preciseness of being shape-matched with the oral cavity and support strength can be provided.

Fourth, an inner surface contour of the digital overdenture is set on the basis of a scanned image of the temporary denture corrected by pressurizing the holder device toward a relining resin being filled in an inner surface. Also, the scanned image of the temporary denture is replaced with a virtual holder device extracted from a digital library. Through this, highly precise design information with minimized unevenness of a surface, notches, or distortion generated during a process of correcting or scanning the temporary denture can be obtained.

Fifth, when a flattening guide designed and manufactured according to the dental restoration plan is installed in the oral cavity, flattening of an alveolar bone is performed using a simple method of restricting the contact between a flattening device and an edge of an opening portion formed corresponding to flattening information. That is, since a flattening operation is performed only as much as an area and a thickness of the alveolar bone exposed through the opening portion, convenience and preciseness in treatment can be significantly improved.

Sixth, installation positions of the flattening guide and a surgical guide which guides implanting of the fixture into the flattened alveolar bone are aligned in the oral cavity through anchor fixing portions formed on the basis of the same anchor pin information. Accordingly, even when the guides are sequentially fixed and separated, it is possible to guide precise operations according to the dental restoration plan.

As described above, the present invention is not limited to the above-described embodiments and may be modified by one of ordinary skill in the art without departing from the scope of the claims of the present invention and such modifications are included within the scope of the present invention.

What is claimed is:

1. A method of manufacturing an overdenture, comprising:
   a first stage of obtaining an implantation information for guiding an implantation of a fixture on an alveolar bone of a target arch, wherein the alveolar bone will be worked on to have a flattened top surface, the first stage comprising:
   generating a three-dimensional planning image on a computerized display, the three-dimensional planning image includes a surface information of the target arch, a surface information of an opposing arch, and a three-dimensional information of the alveolar bone, wherein the three-dimensional information of the alveolar bone includes a flattening information for forming the flattened top surface;
   aligning the surface information of the target arch on the three-dimensional planning image generated on the computerized display, the surface information of the opposing arch, and the three-dimensional information of the alveolar bone to correspond to a preset vertical dimension; and
   determining the implantation information on the three-dimensional planning image generated on the computerized display by aligning a fixture inside the alveolar bone with the flattened top surface as to allow a top end of the fixture to correspond to the flattened top surface,
   a second stage of designing and manufacturing a flattening guide based on the flattening information and a surgical guide based on the implantation information by a 3D printing, wherein
   the flattening guide has an opening portion configured to guide flattening of the alveolar bone of the target arch on the basis of the flattening information; and
   the surgical guide has a fixing groove portion shape-matched with the target arch having the alveolar bone with the flattened top surface and a guide hole configured to guide implantation of the fixture on the alveolar bone of the target arch on the basis of the implantation information,
   a third stage of forming a temporary holder insertion portion within a temporary denture, the third stage comprising:
   installing the flattening guide on the target arch and flattening the alveolar bone with guiding of the flattening guide to form the flattened top surface;
   installing the surgical guide on the target arch, drilling the alveolar bone using the guide hole of the surgical guide to form an implantation hole in the alveolar bone with the flattened top surface, and implanting the fixture in the implantation hole;
   fixing a holder device to the fixture implanted on the alveolar bone;
   mounting the temporary denture on the alveolar bone on which the holder device is fixed, wherein the temporary denture comprises a temporary tooth portion having an outer surface occluded with the opposing arch and a temporary gum portion integrally extending from the temporary tooth portion and including a marginal groove filled with a dental resin; and
   engraving and curing the dental resin to form the temporary holder insertion portion corresponding to an outer surface shape of the holder device in the dental resin using an occlusal pressure;
   a fourth stage of obtaining a corrected scanning image of the temporary holder insertion portion through scanning the temporary denture and exposing a 3D surface information of the temporary holder insertion portion; and
   a fifth stage of manufacturing the overdenture including an artificial tooth portion, an artificial gum portion and a holder insertion portion by a 3D printing, wherein the holder insertion portion is formed based on the 3D surface information of the temporary holder insertion portion of the corrected scanning image, and wherein the overdenture includes a through hole to fix a clip detachably fastened to the holder device using a curable resin.

2. The method of claim 1, wherein in the second stage, the flattening guide has an inner surface portion shape-matched with the three-dimensional information of the alveolar bone, the opening portion to expose the alveolar bone to be flattened, and at least one flattening anchor fixing portion along a side portion of the flattening guide to fasten a flattening anchor pin fixed to the target arch.

3. The method of claim 2, wherein in the second stage, the surgical guide has the fixing groove portion, the guide hole, and at least one surgical anchor fixing portion to fasten a surgical anchor pin fixed to the target arch, and
   wherein the flattening anchor fixing portion and the surgical anchor fixing portion are formed at positions corresponding to a same position of the alveolar bone on a basis of an anchor pin information preset in the three-dimensional planning image.

4. The method of claim 3, wherein the second stage further comprises manufacturing a surgical alignment piece having one surface shape-matched with the opposing arch and an other surface shape-matched with an outer end of the guide hole such that the surgical anchor fixing portion are aligned corresponding to the anchor pin information.

5. The method of claim 4, wherein the second stage further comprises manufacturing a target side impression model for the target arch and an opposing side impression model for the opposing arch through 3D printing based on the three-dimensional planning image.

6. The method of claim 4, wherein the second stage further comprises manufacturing a target side impression model for the target arch and an opposing side impression model for the opposing arch through 3D printing based on the three-dimensional planning image, wherein the target side impression model has a temporary flattened surface corresponding to the alveolar bone having the flattened top surface, and
   wherein the surgical alignment piece is manufactured by aligning and spacing the target side impression model and the opposing side impression model corresponding to the preset vertical dimension with an occlusion-alignment guide and injecting a dental resin into a gap between the opposing side impression model and the surgical guide disposed on the target side impression model, wherein the dental resin fills the gap between the opposing side impression model and the surgical guide to partially overlap ends of the opposing side impression model and the surgical guide which face each other.

7. The method of claim 6, wherein in the third stage, the holder device comprises a holder abutment fixed to the fixture and provided with a through hole formed in one side of the holder abutment and a fixing bar curved to be fastened in the through hole.

8. The method of claim 1, wherein in the fourth stage, the corrected scanning image of the temporary holder insertion portion is obtained by scanning inner and outer surfaces of the temporary denture and swapping 3D surface information of the temporary denture to outwardly expose surface information of an inner surface of the temporary holder insertion portion, and wherein the fifth stage further comprises;

extracting a virtual artificial tooth portion and a virtual artificial gum portion from a digital library; and virtually disposing the virtual artificial tooth portion and the virtual artificial gum portion in the three-dimensional planning image generated on the computerized display;

swapping an inner surface of the virtual artificial gum portion with the corrected scanning image of the temporary holder insertion portion;

replacing the corrected scanning image of the temporary holder insertion portion with a virtual holder device extracted from the digital library;

virtually disposing a virtual clip on the virtual holder device; and generating a design information of the overdenture to have a virtual through hole matched with the virtual clip.

* * * * *